United States Patent [19]
Chase

[11] Patent Number: 5,914,048
[45] Date of Patent: Jun. 22, 1999

[54] ADJUSTABLE CONTROL VALVE SYSTEM FOR ROTATING DISC FILTER AND METHOD OF OPERATING THE SYSTEM

[75] Inventor: Calvin Chase, Dunstable, Mass.

[73] Assignee: Beloit Technologies, Inc., Wilmington, Del.

[21] Appl. No.: 08/969,560

[22] Filed: Nov. 13, 1997

[51] Int. Cl.⁶ .............................. B01D 33/74; B01D 17/12
[52] U.S. Cl. ...................... 210/741; 137/487.5; 210/90; 210/116; 210/247; 210/331; 210/404; 210/406; 210/486; 210/780
[58] Field of Search .................................. 210/90, 97, 109, 210/116, 138, 141, 143, 247, 248, 331; 332/346, 404, 406, 486, 741, 780; 162/335, 336, 368, 369, 370, 372; 137/118.06, 118.07, 119.08, 119.09, 119.1, 487.5

[56] References Cited

U.S. PATENT DOCUMENTS

| | | |
|---|---|---|
| 1,757,355 | 5/1930 | Benjamin et al. . |
| 3,233,736 | 2/1966 | Vernay . |
| 3,363,774 | 1/1968 | Luthi . |
| 3,902,960 | 9/1975 | Zentner et al. ......................... 162/199 |
| 4,057,373 | 11/1977 | Schwing .................................. 417/519 |
| 4,223,700 | 9/1980 | Jones ...................................... 137/874 |
| 4,608,171 | 8/1986 | LaValley ................................ 210/404 |
| 4,683,059 | 7/1987 | LaValley ................................ 210/404 |
| 5,053,123 | 10/1991 | Clarke-Pounder et al. ............. 210/138 |
| 5,264,138 | 11/1993 | Heino et al. ............................ 210/784 |
| 5,503,737 | 4/1996 | Luthi ...................................... 210/247 |
| 5,674,396 | 10/1997 | Wenzl et al. ........................... 210/331 |

*Primary Examiner*—Joseph W. Drodge
*Attorney, Agent, or Firm*—Hill & Simpson

[57] ABSTRACT

A control system for the vacuum cut-off valve of a rotating disc or drum filter is provided. The control system includes an actuator that is connected to the vacuum cut-off valve for adjusting the rotation of the vacuum cut-off valve with respect to the core. The actuator is linked to a controller which receives communications from a vacuum sensor that senses the level of vacuum inside the vacuum box. The controller sends signals to the actuator to either move the vacuum cut-off valve forward (or to a higher position) or rearward (or to a lower position) in response to the vacuum or pressure level inside the vacuum box.

20 Claims, 4 Drawing Sheets

ATMOSPHERIC DRAIN

GRAVITY DRAIN

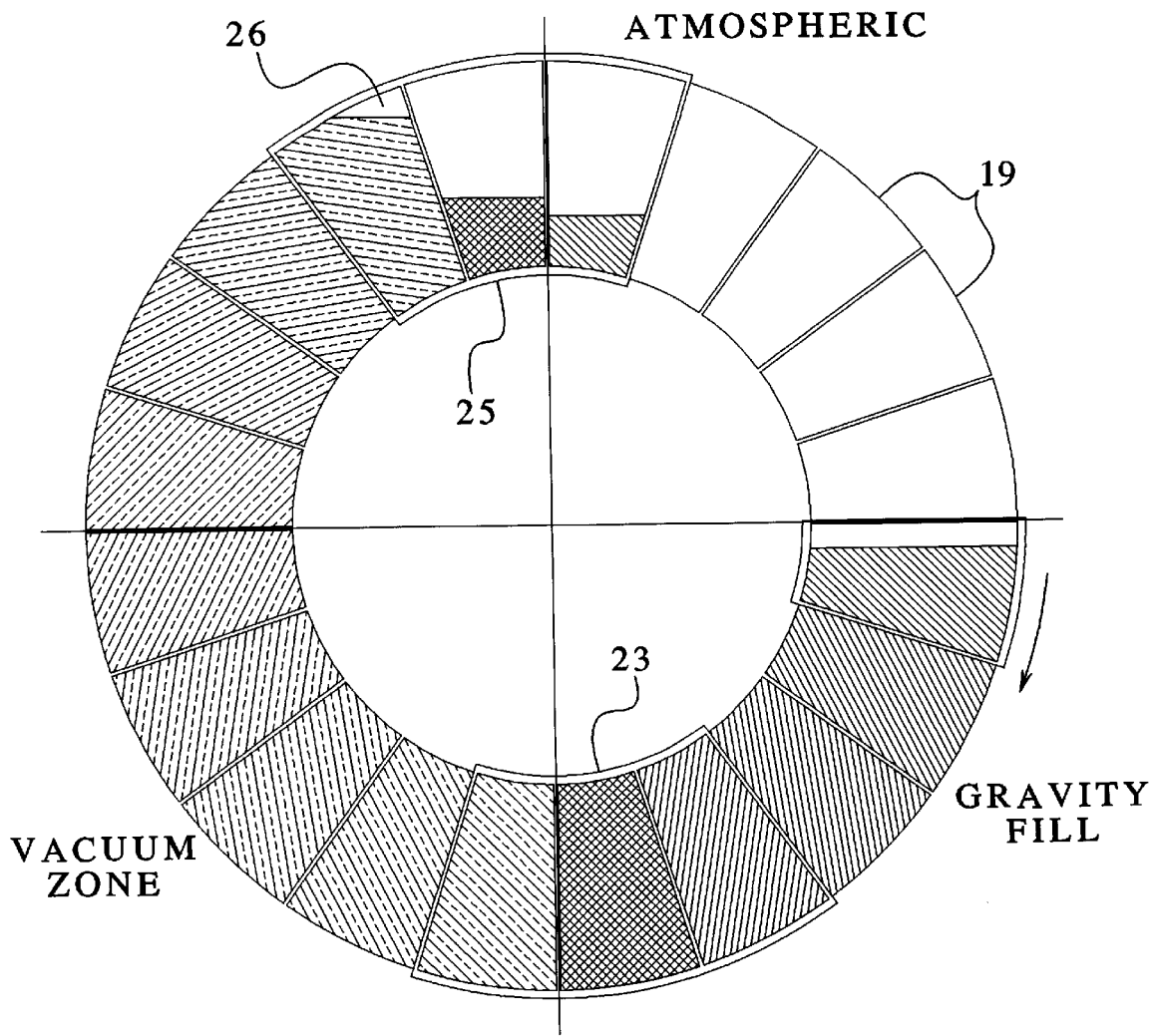
**FIG.2
(PRIOR ART)**
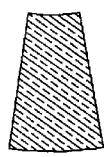  FILTRATE FLOW VACUUM DRIVEN
  FILTRATE NO FLOW
  CORE PREFILL GRAVITY DRIVEN

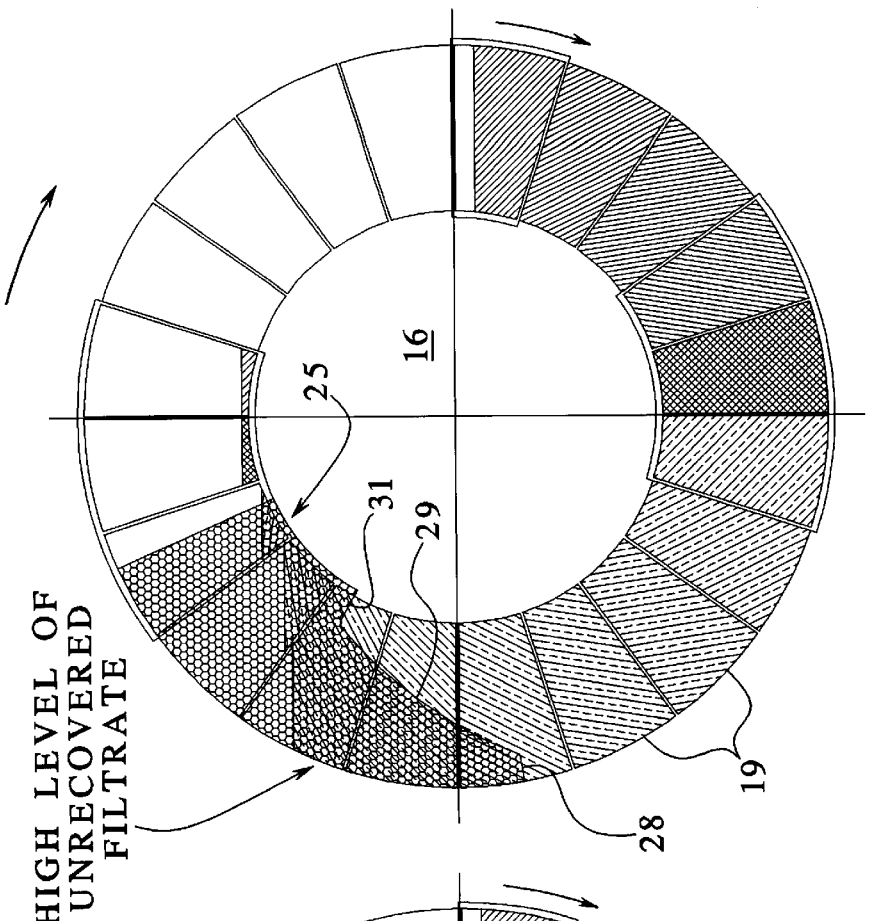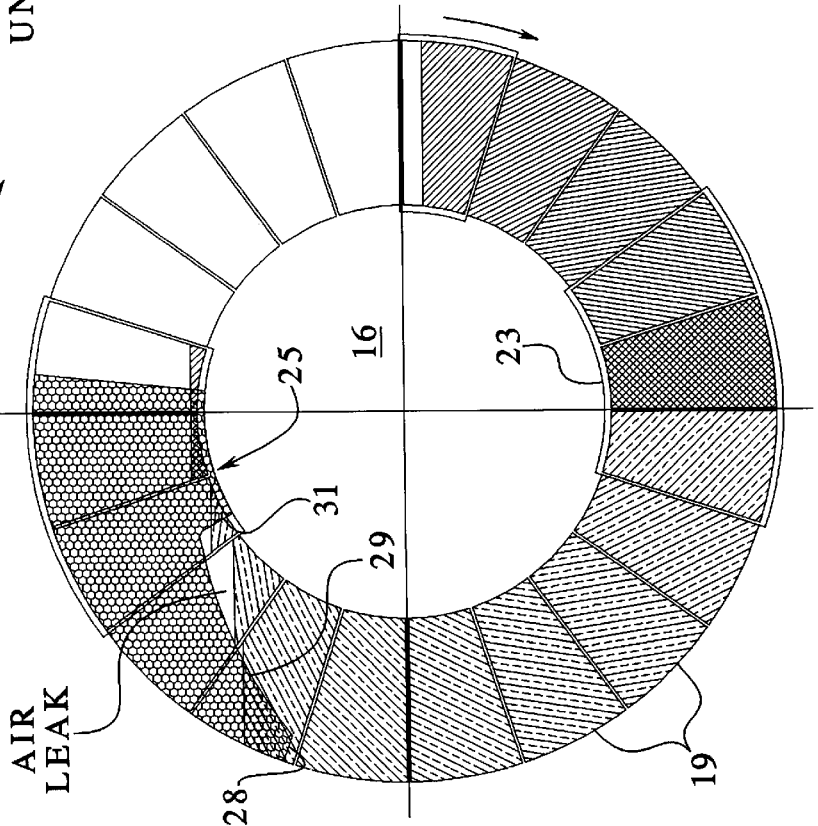

ADJUSTABLE CONTROL VALVE SYSTEM FOR ROTATING DISC FILTER AND METHOD OF OPERATING THE SYSTEM

BACKGROUND OF THE INVENTION

Field of the Invention

The present invention relates generally to valves for vacuum filters and, more specifically, to valves for rotating disc filters used in the production of pulp from a pulp slurry. Still more specifically, the present invention relates to an adjustable valve for a rotating disc filter that can selectively restrict the flow of filtrate from the pulp slurry through the disc filter segments.

In the pulp and paper industry, disc and other rotary type filters are used for two primary purposes: to thicken pulps by removing liquid under a combination of gravity and vacuum induced drainage; and to act as save-ails for recovering separated liquid into a number of filtrate streams containing varying amounts of particulate matter. Typical disc filters include two phases; an atmospheric draining where gravity is employed to drain filtrate from the pulp as it collects on the rotating disc; and a vacuum cycle where a vacuum is generated by a difference in the hydrostatic heads between the vat in which the rotating disc filter is contained and the barometric leg which is the conduit that drains filtrate collected in the central core of the disc filter.

Different pulps require different conditions to form a pulp mat on the disc segments and to optimize the clarity of the clear portion of the collected filtrate. Specifically, for optimal disc filter operation, a slow draining pulp requires a longer vacuum cycle and a fast draining pulp requires a shorter vacuum cycle. The duration of the vacuum cycle is determined by the timing of the closing of a valve disposed between the rotating disc segments and the core of the disc filter. Even with prior testing, it has become impossible to predict and design exactly the optimum vacuum cut off point for any given pulp. In addition, the operator of the plant may be forced to vary the pulp characteristics on a regular basis depending upon the product being manufactured and the raw materials being supplied. Thus, the traditional fixed vacuum cut off point or fixed valve timing in the rotational cycle of the disc filter is problematic because the incorrect timing of the vacuum cut off point will adversely effect pulp formation and filtrate clarity.

The complexity of this problem is illustrated in FIGS. 1–3. Referring to FIG. 1, a vat 10 is illustrated which is partially filled with a pulp slurry 11. A disc filter core 12 is further contained within a vacuum box 13, both of which are partially submerged in the slurry 11. The filter 12 includes a plurality of sectors 14 which are rotated in the direction of the arrow 15 through the pulp slurry 11. The sectors 14 are in communication with a drainage structure which features a centralized core 16. The core is in communication with a first barometric or drop leg 17, also known as the "cloudy" leg. The filtrate carried away by leg 17 has a higher concentration of fibers than that carried away by the second barometric leg 18, also known as the "clear" leg. The second leg 18 carries away filtrate that comes through the sheet formed on the sector 14 during the vacuum cycle as discussed below. The filtrate carried away by the second leg 18 is clearer than the filtrate carried away by the first leg 17 because of the increased filtering effect of the sheet or mat formed on the sector 14.

The sector 14 is formed of either a plastic mesh or stainless steel woven screen. The centralized core 16 is typically separated into segments 19. As the disc 12 is rotated, the sector enters the slurry and filtrate begins to fill the sector. This initial filtrate which includes some suspended pulp fiber, is pushed through the filter medium by the hydrostatic pressure head of the slurry 11 in the vat 10. At the very beginning of this stage, flow from the filter sector 14 to the core 16 is initially cut off by a valve 27 until a sufficient amount of filtrate is accumulated in the segment 19 and the sector 14. Then, as the disc 12 and core 16 rotate, a valve opening is passed and air accumulated in the disc segment 19 and the sector 14 is vented to the atmosphere during the phase marked A in FIG. 1. As discussed below, it is important to remove the excess air as it will decrease the vacuum provided by the drop legs 17, 18. Also occurring at this initial stage is the beginning of the formation of a sheet on the face of the filter sector 14. It is the formation of the sheet, in combination with the filter mesh, that permits nearly complete removal of the fiber from the filtrate. As the disc continues to rotate in the clockwise direction (see arrow 15), excess filtrate is removed through a gravity drain 22. As shown in FIG. 2, the gravity drain is not operated on vacuum.

Returning to FIG. 1, as the core 16 and sector 14 continue to rotate, a valve shown schematically at 23 closes off filtrate flow from the core 16 and filtrate flow is terminated. The core 16 at this point is filled with filtrate and the closure by the valve 23 lasts for only one sector 14 in the rotation cycle. As the core 16 and sector 14 pass the valve 23, the core channel is then reopened and a vacuum is provided by the hydrostatic pressure drop existing between the vacuum box 13 and the leg 17 at the start of the phase marked B and the leg 18 towards the end of the vacuum phase. The vacuum or pressure drop allows filtrate to drain through the disc sectors 14 and the segments 19 to the legs 17, 18. The vacuum becomes the driving force that pulls the filtrate through the sheet or mat that has formed on the disc. During this formation, the sheet is thickened and densified thereby acquiring material integrity. As the core 16 and sectors 14 continue to rotate, the loss of fiber through the sheet becomes minute thereby producing the "clear" filtrate that is carried away by the second leg 18.

A splitter plate 24 is provided to split the flow between the first leg 17 and second leg 18 in the region marked E. Some systems require a third barometric leg (not shown). This leg would carry away the last portions of filtrate collected under the vacuum, or just prior to the arrival of the segment 19 at the vacuum cut off valve 25 which will be discussed in detail below.

Continuing with the clockwise rotation of the filter 12, as the filter sector 14 emerges from the slurry 11 at region F, the sheet formed on the face of the filter will begin to dry out. A vacuum is maintained on the sector 14. The passage of air through the sheet formed on the sector 14 is limited due to the density of the sheet. As the segment approaches the valve 25 (see the region labeled G), some air will filter through the sheet allowing additional filtrate trapped in the sheet and sector 14 to be drained and pulled into the core 16. This air passage to the core is illustrated at 26 in FIG. 2. As the segment 19 traverses the cut off valve 25, flow from the core 16 is terminated. Then, the sheet will be removed by knock-off showers (not shown) that peel the sheet off the facing of the sector 14 thereby allowing the sheet to drop out of the vat 10 through stock discharge boxes (not shown). As the sector 14 and core 16 continues to rotate, the valve 25 is passed and flow from the core 16 occurs by gravity only for approximately one leaf cycle (see the region labeled H). Flow is then cut off again by the valve shown at 27 where the sector 14 is cleaned with a high pressure water stream (not shown). The screen cleaning takes place in the region labeled I.

As noted above, different pulps require different conditions in order to optimize mat or sheet formation and in order to optimize the clarity of the filtrate collected through the second leg 18. As indicated in FIGS. 3A and 3B, the timing of the vacuum cut off provided by the valve 25 is crucial. Further changes in the consistency of the slurry 11 or in the type of pulp being filtered can greatly affect the timing and the efficiency of the disc filter 12. As shown in both FIGS. 3A and 3B, if the timing is not accurate, air can leak from the filter segments into the core 16 and barometric leg 18, thereby destroying the vacuum provided by the leg 18. When the vacuum is destroyed in the leg 18, trapped filtrate in the leaf will backwash and force the formed sheet away from the face of the sector 14. A portion of the sheet may be lost into the vat 10 thereby increasing the free passage for air to proceed into the core 16. The vacuum provided by the leg 18 can be eliminated which would require a shut-down of the operation.

Referring to FIG. 3A, if the vacuum cut off provided by the valve 25 is too late or "too high", the lack of filtrate in the segment 19 will permit air to leak into the core thereby reducing the vacuum provided by the leg 18. As shown in FIG. 3B, if the cut-off provided by the valve 25 is too low, excess filtrate will remain in the segments 19 which will result in backwash of the filtrate because flow has been stopped which, in turn, will eliminate the residual vacuum in the structure of the sector 14. This backwash can cause loss of part of the sheet and clear filtrate back into the vat.

Until now, the only advances in controlling the vacuum cut-off point provided by the prior art is the design of the cut-off valves 25 themselves. Referring to FIGS. 3A and 3B, the valve 25 includes an open end 28 which permits the flow of filtrate through the segments 19 to the vacuum box 13. A tapered middle section 29 gradually restricts this flow. Finally, a closed end 31 provides the vacuum cut-off. It is the timing of the vacuum cut-off provided by the closed end 31 of the valve 25 that is crucial for the reasons discussed above.

Accordingly, there is a need for an improved method and apparatus for repositioning the vacuum cut-off valve during operation of the filter 12 to reduce the amount of filtrate lost back into the vat from rewetting of the sheet and further to control the amount of air passing into the core 16.

SUMMARY OF THE INVENTION

The present invention addresses the aforenoted needs by providing a control system for controlling the timing of the vacuum cut-off and an improved method of controlling the timing of the vacuum cut-off in disc filters.

The valve control system of the present invention includes a valve body that has an open end for permitting filtrate to pass through the core segment and a closed end for preventing flow of filtrate through the core segment. The valve body is connected to an actuator for adjusting the position of the valve body with respect to the core. Specifically, the actuator can move the valve body forwardly about the core in the direction of rotation of the disc filter and rearwardly about the core, in a direction opposite to the rotation of the disc filter. The actuator is in communication with a controller which receives signals from a pressure sensor disposed inside the vacuum box. The controller sends signals to the actuator to move the valve body in either the forwardly or rearwardly directions in response to signals received from the pressure sensor. Specifically, if the vacuum is too low, or the pressure is too high, inside the vacuum box, the controller sends a signal to the actuator to retract or move the valve rearwardly from its too high of a position to the appropriate position. In contrast, if the level of vacuum is too high, or the pressure too low, inside the vacuum box, the controller sends a signal to the actuator to move the valve forward from its current position, which is too low, to a higher position.

In an embodiment, the actuator comprises a rod that is pivotally connected to the valve body whereby linear movement of the rod results in arcuate movement of the valve body along a section of the perimeter or circumference of the core.

In an embodiment, the actuator comprises a piston rod. The actuator translates signals from the controller into linear movement of the piston rod. The linear movement of the piston rod results in arcuate movement of the valve body about the circumference of the core.

In an embodiment, the valve body also comprises a middle section disposed between the open and closed end for partially restricting the flow of filtrate through the disc segment or leaf to the core.

In an embodiment, the controller is a programmable controller which is programmed to send a signal to the actuator to move the valve body forward or to a higher position when the pressure in the vacuum box falls below a predetermined level and, the controller is programmed to send a signal to the actuator to move the valve body rearward when the pressure in the vacuum box rises above a predetermined level.

In an embodiment, the controller is a programmable controller that is programmed to send a signal to the actuator to move the valve body forward when the vacuum in the vacuum box is higher than a predetermined acceptable level and further which sends a signal to the actuator to move the valve body to a lower position when the level of vacuum in the vacuum box drops below a predetermined acceptable level.

In an embodiment, the controller is further characterized as a programmable controller having a memory which can store a plurality of acceptable pressure and vacuum levels for a variety of different pulps.

In an embodiment, the programmable controller has a memory which can store a plurality of optimal vacuum and pressure levels for a variety of different pulp slurry characteristics.

In an embodiment, the present invention provides a method of controlling the vacuum level in a vacuum box of a disc filter. The method includes the steps of establishing a predetermined pressure value for the vacuum box, sensing the pressure level in the vacuum box and, in the event the pressure level in the vacuum box falls below a predetermined value, moving the closed end of the valve body forward in the direction of rotation of the disc, and in the event the pressure level in the vacuum box exceeds the predetermined value, moving the closed end of the valve body rearward in a direction opposite to the rotation of the disc.

It is therefore an advantage of the present invention to provide an improved control system for the vacuum cut-off valve of a disc filter.

Another advantage of the present invention is to provide an improved method of controlling the timing of the vacuum cut-off for a disc filter.

Yet another advantage of the present invention is to provide an improved method of controlling the pressure level inside a vacuum box of a disc filter.

Another advantage of the present invention is to provide an improved method of controlling the flow of filtrate from disc segments to the core of a rotating disc filter.

Still another advantage of the present invention is to provide a method of reducing filtrate backwash during the separation of pulp from filtrate with rotating disc filters.

Other objects and advantages of the present invention will become apparent upon reading the following detailed description and upon a review of the accompanying drawings.

BRIEF DESCRIPTION OF THE DRAWINGS

The invention is illustrated more or less diagrammatically in the accompanying drawings wherein:

FIG. 2 is a schematic illustration of the flow of filtrate during the rotational cycle of a disc filter;

FIGS. 3A and 3B are schematic illustrations of the effect of vacuum cut-off timing on the performance of a disc filter.

Figure 1:
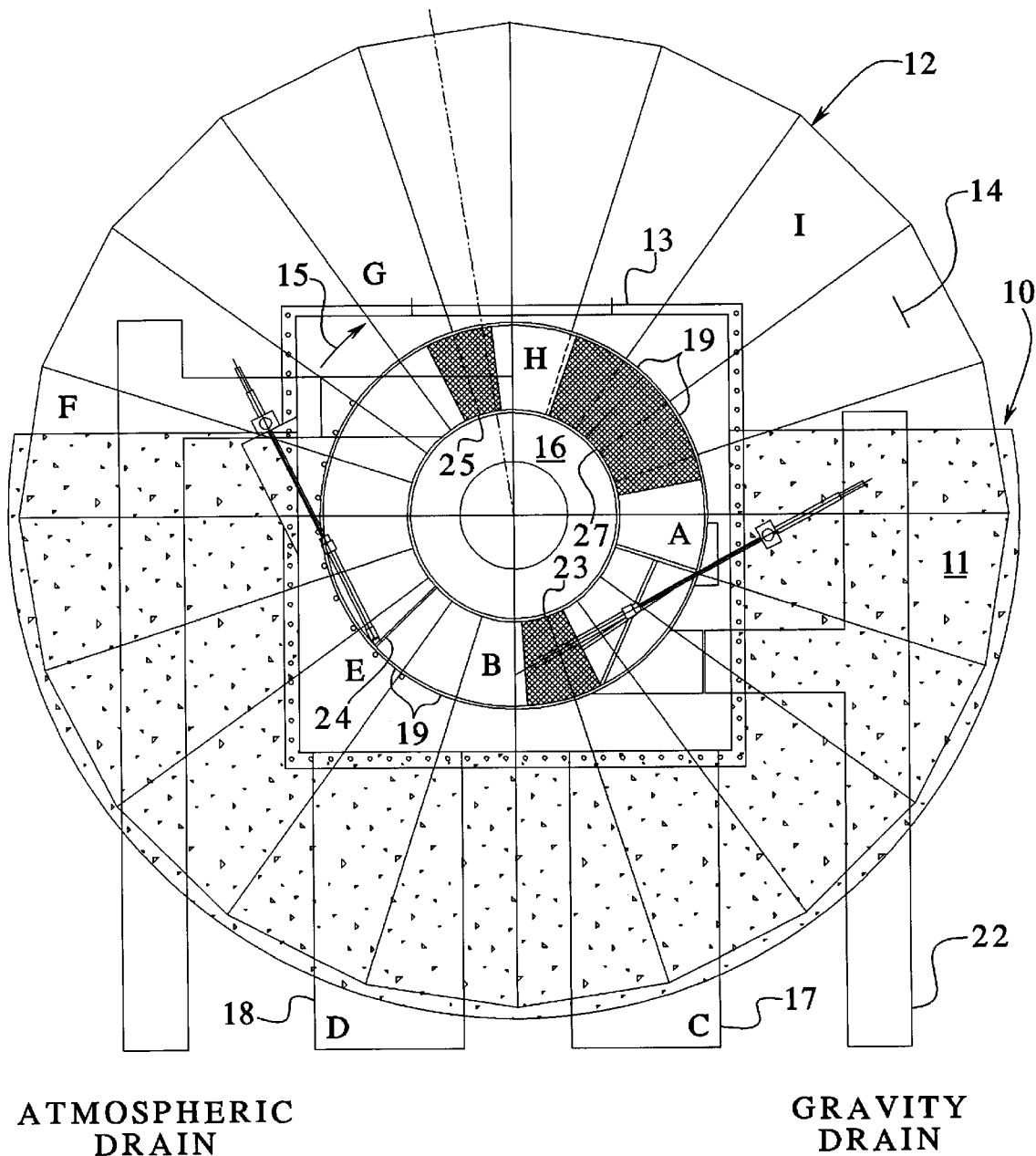
FIG. 1 is a schematic end view of a disc filter apparatus.

It should be understood that the drawing is not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Figure 4:
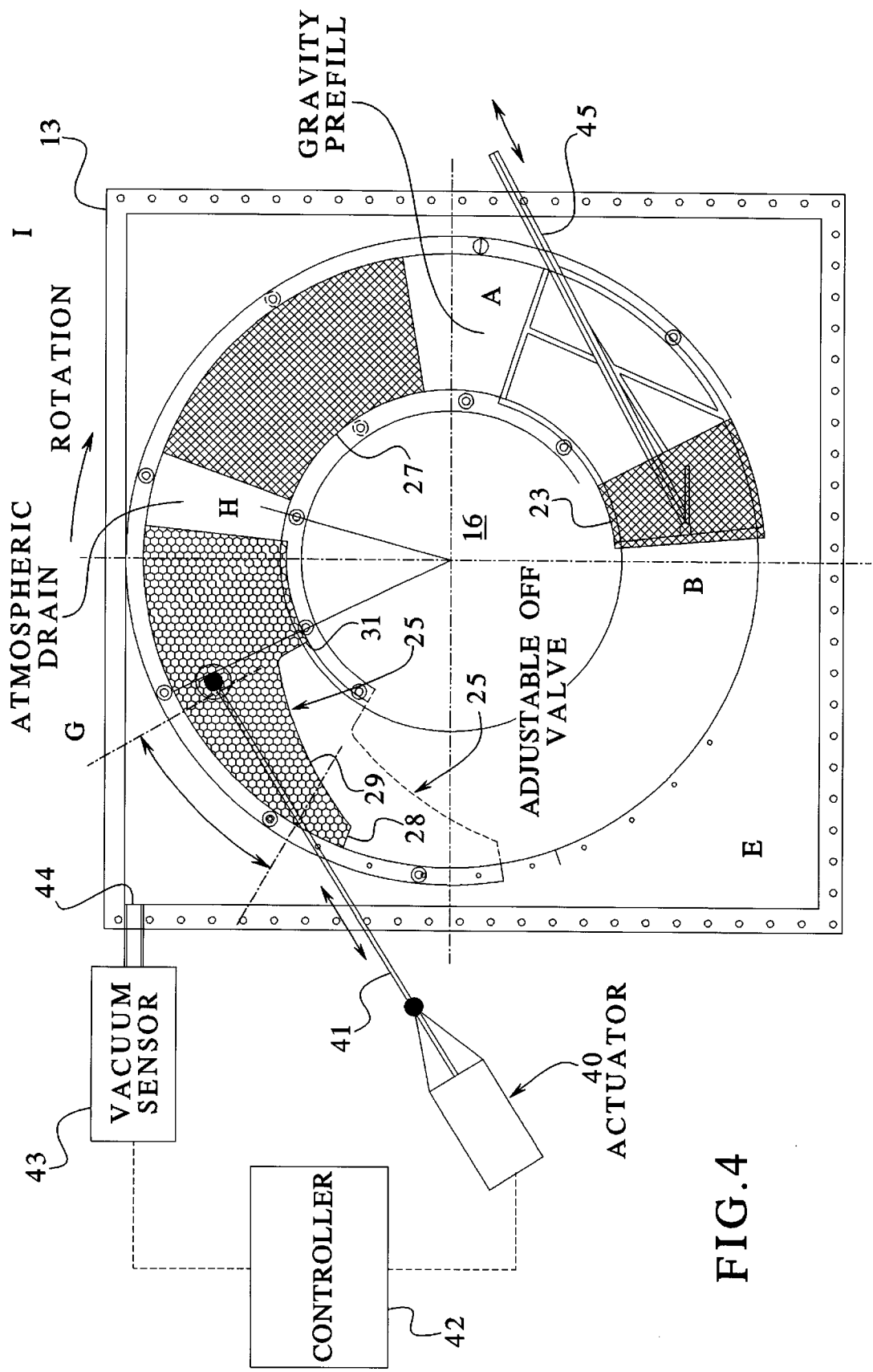
FIG. 4 is a schematic end view of a disc filter equipped with the vacuum cut-off valve control system made in accordance with the present invention.

As discussed above, the timing of the application of the vacuum cut-off valve 25 is crucial and will vary depending on the characteristics of the slurry and pulp. Further, the physical characteristics of the slurry and pulp may not be static and therefore a continual adjustment of the position of the vacuum cut-off valve is important. The present invention, as illustrated in FIG. 4 provides this capability.

Specifically, like reference numerals have been used to identify the same or similar described above in connection with FIGS. 1, 2, 3A and 3B. Instead of its position being fixed, the position of the cut-off valve 25 with respect to the core 16 is adjustable by way of the actuator 40. In the embodiment illustrated in FIG. 4, the actuator 4 includes an expandable and retractable rod 41 which is pivotally coupled to the valve 25. Linear movement of the rod 41 results in arcuate movement of the valve 25. Specifically, retraction of the rod 41 from the position shown in FIG. 4 would result in a movement of the valve 25 from the high or forward position shown in a solid line in FIG. 4 to the low or retracted position shown in phantom in FIG. 4. The actuator 40 is in communication with a controller 42. The controller 42 is in communication with a vacuum sensor 43 which, in one embodiment, may include a pressure transducer 44 disposed inside of the vacuum box 13. The controller 42 receives pressure or vacuum level signals from the vacuum sensor 43. The controller 42 then compares the measured signal with a program acceptable level stored in the memory of the controller.

If the level of vacuum in the box 13 is too low (or the pressure is too high) in comparison with an acceptable pre-determined level, air is most likely leaking from the core as illustrated in FIG. 3A. The position of the valve 25 is too high or too far forward. Therefore, the controller 42 will send a signal to the actuator 40 to retract or draw the valve 25 rearward or to a lower position, or toward the position shown in phantom in FIG. 4. Of course, the positional adjustments made to the valve 25 will most likely be much smaller or more incremental than the large adjustment shown between the solid-line illustration of the valve 25 and the phantom-line illustration of the valve 25 shown in FIG. 4. If the controller receives a signal from the vacuum sensor that the vacuum level is too high (or the pressure level too low), there is too much filtrate in the disc segment 19 and there is a need for at least some air flow from the core. This phenomenon is illustrated in FIG. 3B. The controller 42 will then send a signal to the actuator 40 to move the valve 25 forward thereby permitting additional flow of filtrate (and some air) from the core 16.

The actuator may include a hydraulic piston or may be gear driven. Preferably, the controller has a sufficient amount of memory to store a large number of predetermined acceptable vacuum or pressure levels for a wide variety of slurry conditions and pulp types. Also, it is preferable for the controller 42 to be in communication with another system controller. The controller 42 may also be in the form of a personal computer. The vacuum sensor 43 may be a pressure transducer or other similar device. The location of the transducer 44 may vary and, in addition to disposal inside the vacuum box 13 (above the fluid level), the transducer 44 may also be disposed inside the core 16.

An additional control system may be provided for the timing of the valve 23. Similarly, an actuating rod 45 may be connected to the valve 23. The rod 45 may be connected to an actuator (not shown) similar to the actuator 40.

Although a single embodiment of the present invention has been illustrated, it will at once be apparent to those skilled in the art that variations may be made within the spirit and scope of the present invention. Accordingly, it is intended that the scope of the present invention be limited solely by the hereafter appended claims and not by any specific wording in the foregoing description.

What is claimed:

1. A valve control system for regulating a flow of filtrate from a disc sector of a rotating disc filter to a central core of the disc filter, the disc filter including a vacuum for drawing filtrate through the disc sector into the core, the core being disposed inside a vacuum box, the system comprising:

a valve body, an actuator, a controller and a pressure sensor, the valve body having an open end configured for permitting filtrate to pass through the disc sector and the core into the vacuum box and a closed end configured for preventing flow of filtrate through the disc sector and core, the valve body being connected to the actuator for adjusting the position of the closed end of the valve body with respect to the core whereby the actuator can move the valve body forwardly about the core in a direction of rotation of the disc filter and rearwardly about the core in a direction opposite to the rotation of the disc filter, the actuator being in communication with the controller, the controller receiving signals from the pressure sensor, the pressure sensor configured to be disposed inside the vacuum box, and in response to changes in pressure inside the vacuum box, the controller sending signals to the actuator to move the valve body in the forwardly or rearwardly directions.

2. The valve control system of claim 1 wherein the actuator comprises a rod that is pivotally connected to the valve body, linear movement of the rod resulting in arcuate movement of the valve body along a section of a perimeter of the core.

3. The valve control system of claim 1 wherein the actuator comprises a piston rod, the actuator translating signals from the controller into linear movement of the piston rod, the piston rod being pivotally coupled to the valve body, linear movement of the piston rod resulting in arcuate movement of the valve body about a circumference of the core.

4. The valve control system of claim 1 wherein the valve body further comprises a middle portion disposed between the open and closed ends for partially restricting the flow of filtrate through the core segment to the vacuum box.

5. The valve control system of claim 1 wherein the controller is further characterized as a programmable controller, the controller being programmed to send a signal to the actuator resulting in forwardly movement of the valve body when a pressure in the vacuum box is decreased below a predetermined level.

6. The valve control system of claim 1 wherein the controller is further characterized as a programmable controller, the controller being programmed to send a signal to the actuator resulting in rearwardly movement of the valve body when a pressure in the vacuum box is increased above a predetermined level.

7. The valve control system of claim 1 wherein the controller is further characterized as a programmable controller, the controller being programmed to send a signal to the actuator resulting in forwardly movement of the valve body when a pressure in the vacuum box is decreased below a predetermined level, the controller also being programmed to send a signal to the actuator resulting in rearwardly movement of the valve body when the pressure in the vacuum box is increased above a predetermined level.

8. A control system for regulating a vacuum imposed from a disc sector of a rotating disc filter to a central core of the disc filter, the control system and central core being housed in a vacuum box, the system comprising:

a valve, an actuator, a controller and a pressure sensor, the valve comprising a valve body configured to extend around a portion of an outer circumference of the core, the valve body comprising an open end configured for permitting filtrate to pass through the disc sector to the core and into the vacuum box and a closed end configured for preventing flow of filtrate through the disc sector to the core and into the vacuum box with a middle portion disposed therebetween for partially restricting the flow of filtrate through the disc segment to the core, the closed end facing forward in a direction of rotation of the disc filter, the open end facing rearward opposite to direction of rotation of the disc filter, the valve body being connected to the actuator for adjusting a position of the closed end of the valve body with respect to the core whereby the actuator can move the valve body forwardly about the core and rearwardly about the core, the actuator being in communication with the programmable controller, the controller receiving signals from the pressure sensor, the pressure sensor configured to be disposed inside the vacuum box, the controller being programmed to send a signal to the actuator resulting in rearwardly movement of the valve body when the controller receives a signal from the pressure sensor that a pressure in the vacuum box is above a predetermined level, the controller also being programmed to send a signal to the actuator resulting in forwardly movement of the valve body when the controller receives a signal from the pressure sensor that the pressure in the vacuum box is below a predetermined level.

9. The valve control system of claim 8 wherein the actuator comprises a rod that is pivotally connected to the valve body, linear movement of the rod resulting in arcuate movement of the valve body along a section of the perimeter of the core.

10. The valve control system of claim 8 wherein the actuator comprises a piston rod, the actuator translating signals from the controller into linear movement of the piston rod, the piston rod being pivotally coupled to the valve body, linear movement of the piston rod resulting in arcuate movement of the valve body about a circumference of the core.

11. A method of controlling a vacuum level in a disc filter, the disc filter having a rotating disc with a plurality of disc sectors and a central core with a vacuum across the disc sectors to the core drawing filtrate through the disc sectors and into the core, the rotating disc and core being disposed inside a vacuum box, the method comprising the following steps:

providing a valve body having an open end for permitting filtrate to pass through the disc segments and the core into the vacuum box and a closed end for preventing flow of filtrate through the disc sector and core, establishing a predetermined pressure value for the vacuum box, sensing a pressure level in the vacuum box, in response to the pressure level in the vacuum box falling below the predetermined value, moving the closed end of the valve body forward in the direction of rotation of the disc, in response to the pressure level in the vacuum box exceeding the predetermined value, moving the closed end of the valve body rearward in the direction opposite of rotation of the disc.

12. The method of claim 11 wherein the valve body is connected to an actuator for adjusting the position of the closed end of the valve body with respect to the core whereby the actuator can move the valve body forwardly about the core in a direction of rotation of the disc filter and rearwardly about the core in a direction opposite to the rotation of the disc filter, and the step of moving the valve body forward further comprises sending a signal to the actuator to move the valve body forward, and the step of moving the valve body rearward further comprises sending a signal to the actuator to move the valve body rearward.

13. The method of claim 11 wherein the valve body is connected to an actuator for adjusting the position of the closed end of the valve body with respect to the core whereby the actuator can move the valve body forwardly about the core in a direction of rotation of the disc filter and rearwardly about the core in a direction opposite to the rotation of the disc filter, and wherein the actuator is in communication with a controller, the controller receiving signals from a pressure sensor disposed inside the vacuum box, and in response to changes in pressure inside the vacuum box, the controller sending signals to the actuator to move the valve body in the forwardly or rearwardly directions, and the step of moving the valve body forward further comprises sending a signal from the controller to the actuator to move the valve body forward, and the step of moving the valve body rearward further comprises sending a signal from the controller to the actuator to move the valve body rearward.

14. The method of claim 11 wherein the valve body further comprises a middle portion disposed between the open and closed ends for partially restricting the flow of filtrate through the disc sector and core into the vacuum box.

15. The method of claim 11 wherein the actuator comprises a rod that is pivotally connected to the valve body, linear movement of the rod resulting in arcuate movement of the valve body along a section of the perimeter of the core.

16. The method of claim 11 wherein the actuator comprises a piston rod, the actuator translating signals from the controller into linear movement of the piston rod, the piston rod being pivotally coupled to the valve body, linear movement of the piston rod resulting in arcuate movement of the valve body about a circumference of the core.

17. A method of controlling a vacuum level in a disc filter, the disc filter having a rotating disc having a plurality of disc sectors mounted to a core that rotates, a pressure drop from the disc sectors to the core drawing filtrate through the disc sectors and into the core, the rotating disc and core being disposed inside a vacuum box, the method comprising the following steps:

providing a valve body having an open end for permitting filtrate to pass through the disc sectors and core into the vacuum box and a closed end for preventing flow of filtrate through the disc segment and core, connecting an actuator to the valve body for adjusting a position of the closed end of the valve body with respect to the core whereby the actuator can move the valve body forwardly about the core in a direction of rotation of the disc filter and rearwardly about the core in a direction opposite to the rotation of the disc filter, connecting the actuator to a programmable controller having a memory, the controller receiving signals from a pressure sensor disposed inside the vacuum box, the controller being programmed to send a signal to the actuator resulting in rearwardly movement of the valve body when the controller receives a signal from the pressure sensor that the pressure in the vacuum box is above a predetermined level, the controller also being programmed to send a signal to the actuator resulting in forwardly movement of the valve body when the controller receives a signal from the pressure sensor that the pressure in the vacuum box is below a predetermined level, establishing a predetermined pressure value for the vacuum box, recording the predetermined pressure value in the memory of the controller, sensing a pressure level in the vacuum box with the pressure sensor, sending a signal indicating the pressure level to the controller, determining whether the pressure level in the vacuum box is above or below the predetermined pressure value, in response to the pressure in the vacuum box falling below the predetermined value, sending a signal from the controller to the actuator to move the valve body forward in the direction of rotation of the disc, in response to the pressure in the vacuum box exceeding the predetermined value, sending a signal from the controller to the actuator to move the valve body rearward in the direction opposite of rotation of the disc.

18. The method of claim 17 wherein the valve body further comprises a middle portion disposed between the open and closed ends for partially restricting the flow of filtrate through the disc segment and core into the vacuum box.

19. The method of claim 17 wherein the actuator comprises a rod that is pivotally connected to the valve body, linear movement of the rod resulting in arcuate movement of the valve body along a section of the perimeter of the core.

20. The method of claim 17 wherein the actuator comprises a piston rod, the actuator translating signals from the controller into linear movement of the piston rod, the piston rod being pivotally coupled to the valve body, linear movement of the piston rod resulting in arcuate movement of the valve body about a circumference of the core.

* * * * *